US008887825B2

(12) United States Patent
Valier

(10) Patent No.: US 8,887,825 B2
(45) Date of Patent: Nov. 18, 2014

(54) EARTH GRADING MACHINE WITH ONE OR MORE ROLLERS

(71) Applicant: OTICO, Chalmaison (FR)

(72) Inventor: Carlo Valier, Milan (IT)

(73) Assignee: OTICO, Chalmaison (FR)

(*) Notice: Subject to any disclaimer, the term of this patent is extended or adjusted under 35 U.S.C. 154(b) by 0 days.

(21) Appl. No.: 13/779,037

(22) Filed: Feb. 27, 2013

(65) Prior Publication Data

US 2013/0233581 A1 Sep. 12, 2013

(30) Foreign Application Priority Data

Mar. 9, 2012 (FR) ...................................... 12 00719

(51) Int. Cl.
*A01B 61/04* (2006.01)
*A01B 29/06* (2006.01)
*A01B 29/04* (2006.01)
*A01B 73/00* (2006.01)

(52) U.S. Cl.
CPC ................. *A01B 29/06* (2013.01); *A01B 29/04* (2013.01); *A01B 73/00* (2013.01)
USPC .......................... 172/260.5; 172/519; 172/539

(58) Field of Classification Search
CPC ........ A01B 29/00; A01B 29/02; A01B 29/04; A01B 29/041; A01B 29/043; A01B 29/06; E01C 19/27
USPC .............. 172/150, 170, 172, 260.5, 518, 519, 172/527, 537, 539, 554; 404/122
See application file for complete search history.

(56) References Cited

U.S. PATENT DOCUMENTS

| 1,650,891 | A | * | 11/1927 | Dickinson | ...................... 172/537 |
| 2,404,535 | A | * | 7/1946 | Schmeiser | ..................... 384/587 |
| 4,905,771 | A | * | 3/1990 | Stark | .............................. 172/572 |
| 4,932,477 | A | * | 6/1990 | Atwood | ......................... 172/519 |
| 4,976,052 | A | * | 12/1990 | Jeane | .............................. 37/381 |

(Continued)

FOREIGN PATENT DOCUMENTS

| EP | 1 380 198 | 1/2004 |
| EP | 1 527 665 | 5/2005 |

(Continued)

OTHER PUBLICATIONS

European Search Report issued May 17, 2013 in EP 13 15 8016.

*Primary Examiner* — Matthew D Troutman
(74) *Attorney, Agent, or Firm* — Oblon, Spivak, McClelland, Maier & Neustadt, L.L.P.

(57) ABSTRACT

A ground shaping machine, particularly an agricultural machine, including a frame, at least one roller fitted with a flexible tire, a first bearing and a second bearing whereby the roller can rotate about a substantially horizontal axis in the working position, the first bearing and the second bearing being positioned one at each end of the roller. The frame has a first support and a second support, the first support at least being connected to the first bearing through a suspension device including a mechanism with an upper arm and a lower arm, both substantially horizontal and perpendicular to the axis of rotation of the roller, each of the upper and lower arms being connected by a joint to the first support, and to the first bearing, the mechanism forming a deformable quadrilateral, while the suspension device also have a substantially vertical resilient return member connected by a joint to the first support and to the first bearing.

17 Claims, 9 Drawing Sheets

(56) References Cited

U.S. PATENT DOCUMENTS

| | | | |
|---|---|---|---|
| 5,035,190 A * | 7/1991 | Grimes | 111/195 |
| 5,395,182 A * | 3/1995 | Rossburger | 404/122 |
| 5,494,375 A * | 2/1996 | Yates | 404/126 |
| 5,788,408 A * | 8/1998 | Mitsui et al. | 404/117 |
| 7,124,835 B2 * | 10/2006 | Piou | 172/539 |
| 8,491,451 B2 * | 7/2013 | Phely | 492/30 |
| 8,720,597 B2 | 5/2014 | Piou et al. | |
| 2003/0000713 A1 * | 1/2003 | Mathiowetz | 172/170 |
| 2013/0037284 A1 * | 2/2013 | Phely et al. | 172/537 |

FOREIGN PATENT DOCUMENTS

| | | |
|---|---|---|
| EP | 2 425 697 | 3/2012 |
| FR | 2 117 713 | 7/1972 |
| FR | 2 763 279 | 11/1998 |
| FR | 2 784 331 | 4/2000 |
| FR | 2 841 733 | 1/2004 |
| FR | 2 913 915 | 9/2008 |

* cited by examiner

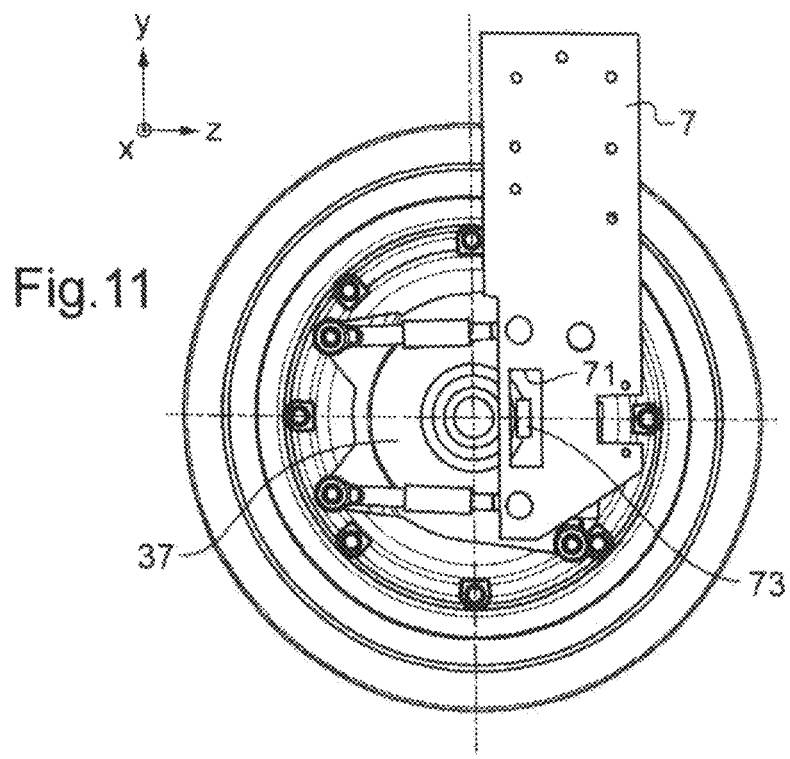
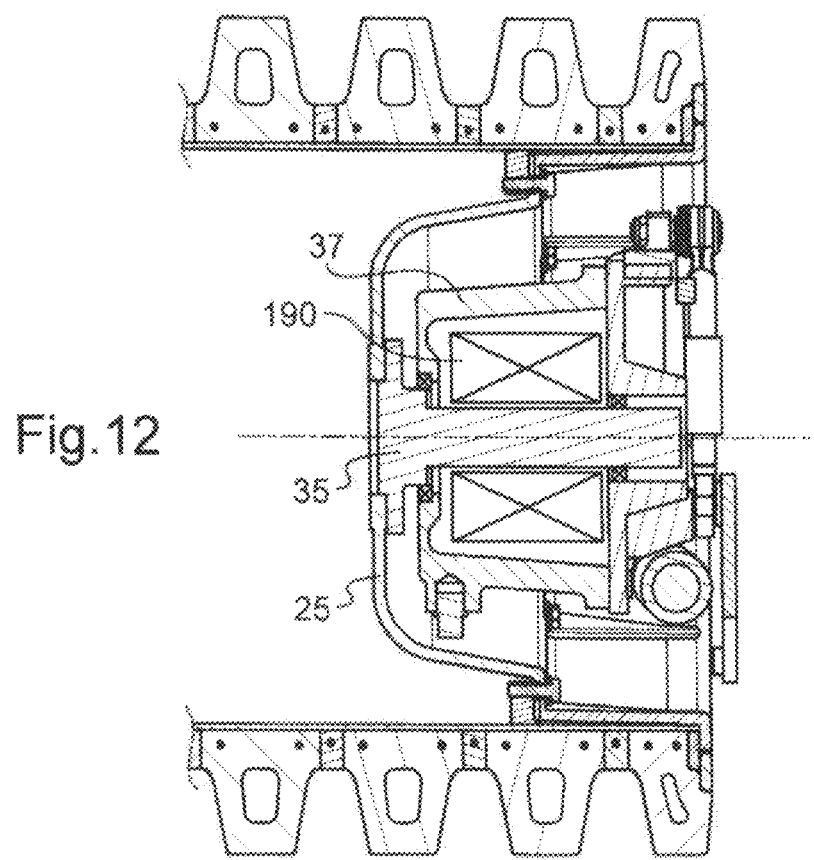

EARTH GRADING MACHINE WITH ONE OR MORE ROLLERS

BACKGROUND OF THE INVENTION

1. Field of the Invention

The invention relates to a ground shaping machine comprising one or more rollers for re-compacting the soil and/or for creating furrows in a soil for sowing or transplanting.

2. Discussion of the Background

In the agricultural sector, an example of a machine of this type is disclosed in FR 2 763 279 in the name of the present applicant. The roller of this machine is fitted with semi-hollow tyres and is designed solely for working on agricultural land. When the machine travels on a road, the roller must be carried, to ensure that its tyres do not run on the road, which would cause rapid wear. The machine including the roller is therefore provided with retractable carrying wheels which can be shifted between a working position, in which the roller rests freely on the ground, and a road position, in which the roller is supported above ground level.

In this type of machine, the carrying wheels in the working position, in other words the retracted position, do not have a soil preparation function. The overall size of the roller, or assembly of rollers, therefore covers the whole working width in the working position. The multiplicity of carrying wheels and rollers across the whole working width makes this agricultural machine complicated. The machine is heavy, resulting in high power consumption.

The present applicant has proposed a semi-mounted agricultural machine whose roller, fitted with its tyres, can work in fields to create furrows in the soil and can then travel on a road without the need to raise the roller. A machine of this type is described in FR 2 841 733. This machine avoids the use of retractable carrying wheels or similar systems and means for controlling such carrying wheels. This system has proved to be satisfactory.

However, the size, weight and bulk of such machines make it difficult to adapt them for transportation on roads, particularly if the roads are uneven. Devices intended to divide the tools into a plurality of rollers, including a suspension arm, tend to limit the length of the rollers and increase the complexity, cost and fragility of the complete device.

The invention will improve this situation.

SUMMARY OF THE INVENTION

The object of the invention is essentially to propose a ground shaping machine, particularly an agricultural machine, comprising a frame, at least one roller with a flexible tire, and a first bearing and a second bearing whereby the roller can rotate about a substantially horizontal axis in the working position, the first and the second bearing being positioned one at each end of the roller.

According to the invention, the frame has a first support and a second support, the first support at least being connected to the first bearing through suspension means including a mechanism with an upper arm and a lower arm, both substantially horizontal and perpendicular to the axis of rotation of the roller, each of the upper and lower arms being connected by a joint to the first support on the one hand, and to the first bearing on the other hand, the mechanism forming a deformable quadrilateral, while the frame also has a substantially vertical resilient return member connected by a joint to the first support on the one hand and to the first bearing on the other hand.

Thus a machine is provided which has a roller or rollers suspended relative to the frame. In operation, that is to say when the machine is travelling in transportation mode or when it is working in ground shaping mode, some of the mechanical energy to which the rollers are subjected in contact with the ground is not transmitted directly to the frame. The rollers have at least a certain number of degrees of freedom relative to the frame. The frame is partially protected from irregularities of the ground such as hummocks, holes and obstacles, which may come into contact or even into collision with the rollers. The mechanical integrity of the frame is preserved and improved.

Moreover, particularly during transportation on roads, the rollers in contact with the ground provide greater adaptability to the road surface. For example, if the road profile is slightly cambered, the roller or rollers may have a contact line which is substantially curved in the plane perpendicular to the direction of advance. The adhesion is high, notably at the lateral edges of the rollers. The speed of travel can therefore be high without adversely affecting the safety and longevity of the machines.

The mechanisms according to the invention are highly compact, facilitating the combination of a machine of this type with other machines, such as seed drills and/or spreaders. The number and duration of operations can be reduced. The costs of production and use can thus be reduced.

The mechanisms according to the invention have an interchangeability which facilitates the maintenance and longevity of the machines.

BRIEF DESCRIPTION OF THE DRAWINGS

Other characteristics and advantages of the invention will be made clear by an examination of the following detailed description, and of the attached drawings, in which:

FIG. 11 is a side view of an embodiment of the invention, and

FIG. 12 is a view similar to FIG. 3, showing a braking means.

DETAILED DESCRIPTION OF THE PREFERRED EMBODIMENTS

Figure 1:
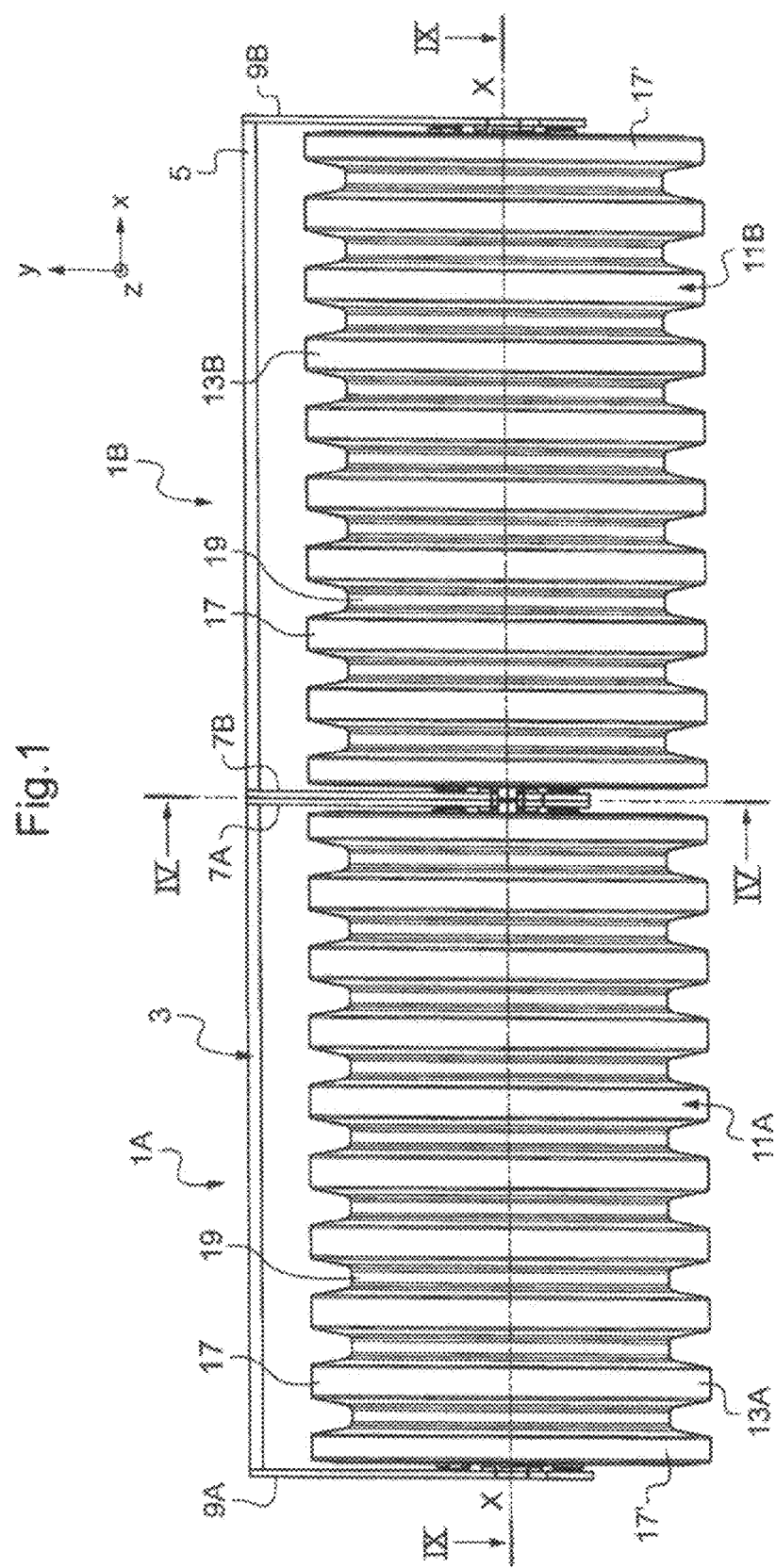
FIG. 1 is a schematic view from the rear of a ground shaping machine in the working position.

The appended drawings are substantially definite in nature and may be used not only to complement the invention but also to contribute to the definition of the invention if required. It should be noted that members such as the bearing and the end shield are difficult to define completely other than by means of the drawing.

The terms front, rear, top, bottom, right and left are used below with respect to the direction of advance of the ground shaping machine in the working position, in other words when the machine is in contact with the ground. A three-dimensional frame of reference is shown in each of the drawings. The arrow marked x represents the lateral direction running from left to right. The arrow marked y represents the vertical direction running from the bottom to the top. The arrow marked z represents the direction of advance, running from the rear to the front. The terms "vertical" and "horizontal" are used here in a relative sense with reference to a condition in which the machine rests on horizontal ground.

Reference is made to FIG. 1, which shows a ground shaping machine. This machine comprises a left-hand assembly or tool 1A and a right-hand assembly or tool 1B.

The shaping machine shown in FIG. 1 has a plane of symmetry IV-IV perpendicular to the direction x and to the plane of the drawing. For clarity, similar members of the left-hand assembly 1A on the one hand, and of the right-hand assembly 1B on the other hand, have been given identical reference numerals, followed by the letter A for the left-hand assembly or the letter B for the right-hand assembly.

The ground shaping machine comprises a frame 3. The frame 3 is intended to be coupled to a vehicle which is not shown, for example a tractor, by coupling means which are not shown. The frame 3 comprises, in the example described here, a bar 5 extending substantially in the direction x. The frame 3 further comprises four supports 7A, 7B, 9A, 9B. In the example described here, the supports 7A, 7B, 9A, 9B are metal plates of generally rectangular shape. The supports 7A, 7B, 9A, 9B are substantially flat and are positioned in planes substantially parallel to the plane of symmetry IV-IV. Their length lies along the vertical direction y. Two of the supports 9A, 9B are positioned one at each end of the bar 5. The two end supports 9A, 9B are fastened to the bar 5, for example by means of screws and nuts or by welding. The other two supports 7A, 7B are fastened to the bar 5, substantially half way along its length. The supports 7A, 7B, 9A, 9B extend downwards from the bar 5. The two supports 7A, 7B are also secured together, one against the other.

In the present case, the ground shaping machine comprises two rollers 11A, 11B. When at rest, the rollers 11A and 11B are substantially aligned along the direction x and therefore have axes of rotation XX which are substantially identical with each other. The length of the rollers 11A, 11B is less than half the length of the bar 5, that is to say a length of less than the distance between each central support 7A, 7B and its respective end support 9A, 9B. The rollers 11A, 11B are positioned between their respective supports 7A, 9A and 7B, 9B.

The right- and left-hand parts of the machine form two assemblies which, in the example described here, are substantially symmetrical with each other about the vertical plane which is perpendicular to the direction x and is located at the interface of the two rollers 11A and 11B. The frame 3, for its part, is common to both of these assemblies. The two assemblies are mirror images of each other about the aforesaid plane.

The frame 3 is not necessarily made in one piece to support both rollers, nor fixed to the structure of the machine.

The two suspended rollers 11A and 11B are not necessarily abutting as shown in FIG. 1. There may be an intermediate section in the centre, between the rollers, which has a shaping function during work in the "field" position and which does not touch the ground in the "road" position. With or without an intermediate section between the rollers, and notably in order to facilitate assembly, each roller may also have its own frame which may be fixed to the assembly with the frame of an adjacent roller.

To change from the "field" position to the "road" position, the rollers must be lowered with respect to the rest of the machine. Consequently, the frames of the suspended rollers are not fixed to the structure of the machine. The connection between the roller frames and the structure of the machine may then be provided by means of a translation or rotation mechanism.

The right-hand assembly, shown in FIGS. 3 to 8, is described more fully below. To avoid complicating the drawings and the description, the references are not given the "A" or "B" suffixes where there is no need to make a distinction between left- and right-hand parts. As a general rule, the left-hand assembly is symmetrical with the right-hand assembly, but some variants may be applicable either to one of the two assemblies only, or to both of them.

Figure 2:
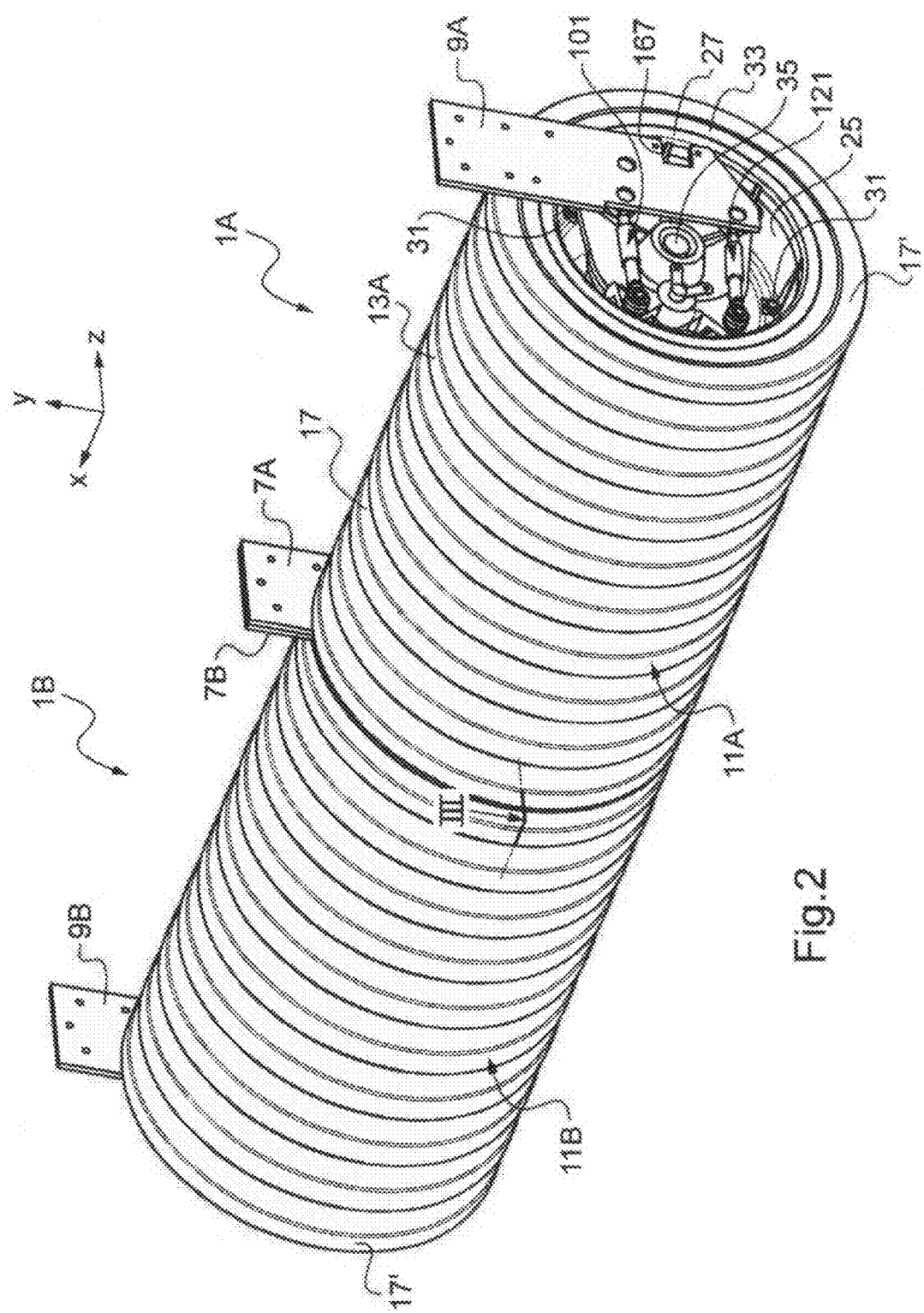
FIG. 2 is a perspective view from the front left-hand side of a ground shaping machine, a part of the frame being not shown.

The bar 5 is not shown in FIG. 2. The rollers 11A, 11B comprise a tube 15, not shown in FIG. 2, around which a flexible tire 13A and 13B respectively is arranged. The tube 15 is cylindrical, with a circular cross section. It is advantageously made of steel.

Figure 3:
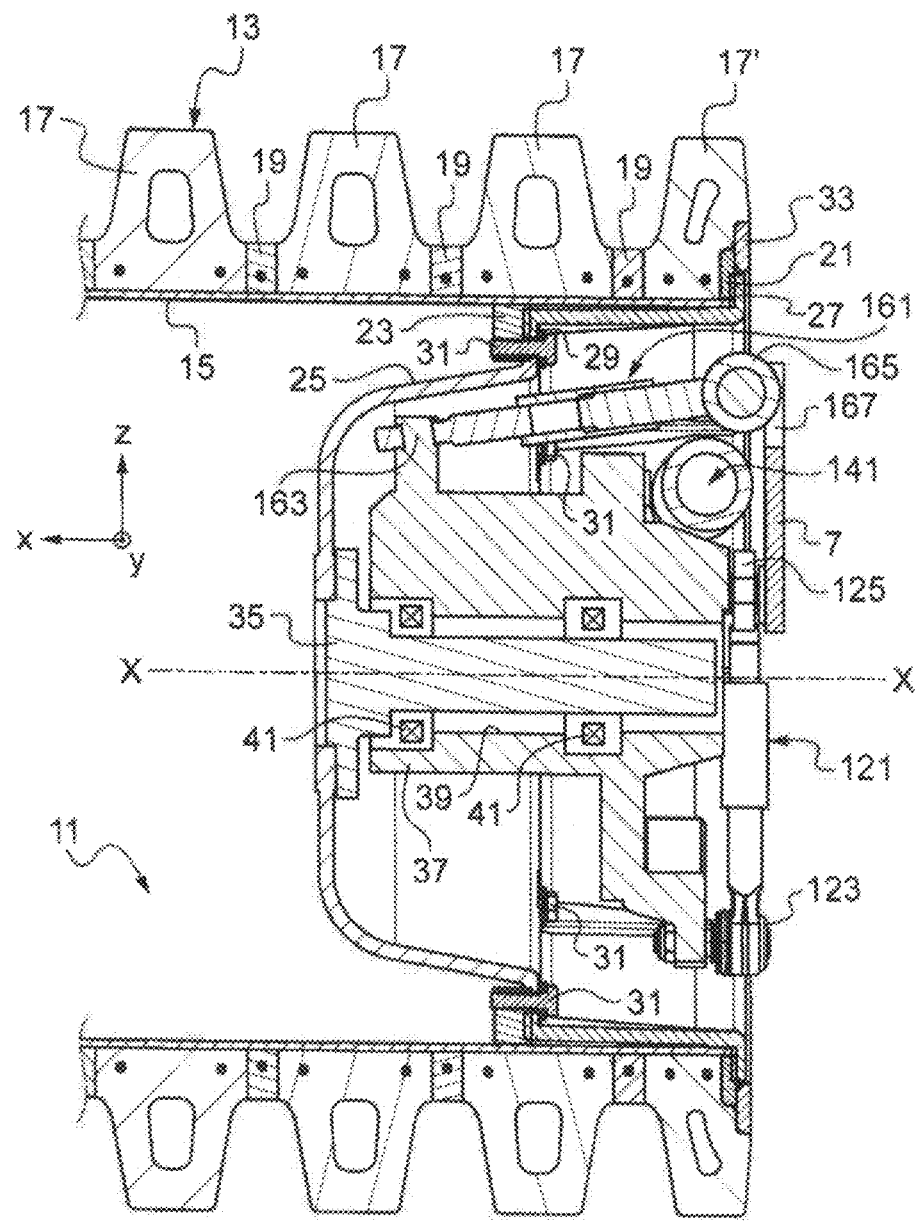
FIG. 3 is a detail view of a cross section taken along the axis IX-IX of FIG. 1.

FIG. 3 is a cross-sectional view from above of one end of one of the shaping tools. In this case, the cross section of FIG. 3 relates to the left-hand end of the right-hand tool 1B, at the position of the support 7B. As can be seen in detail in FIG. 3, the flexible tire 13 mounted on the tube 15 is formed by a sequence of tyres 17, 19 mounted around the tube 15. The tyres 17, 19 are fitted adjacently in an alternating manner against each other and are retained at each end of the stack, for example by means of an end flange 21 fixed to the tube 15 which clamps and retains the set of tyres 17, 19.

In a possible variant arrangement, the tube 15 carrying the flexible tire 13 may not cover the cylindrical portion of the end flange, and part of the tire may be mounted directly on a flange portion having the same outside diameter as the tube.

It is possible to assemble the tyres 17, 19 so that their respective sides form parts in contact with each other. Pressure members at the ends may be used to carry out the assembly.

The various tyres 17, 19 in the stack may also be fixed to each other by appropriate assembly members (not shown), for example those described in FR-A-2-784-331, in the name of the present applicant, which may be consulted for further details. The end flange 21 bears against the first tyre 17' of the stack which, because of its function, may have a profile which differs slightly from that of the tyres 17 in the centre of the roller 11, enabling it to fit into the flange 21. The flange 21 itself is fixed to the tube 15. Thus the stack of tyres 17, 19 and the tube 15 form a fixed assembly constituting a roller 11 which can be mounted rotatably with respect to the frame 3 by means of a set of members which are described below.

The tyres 17 shown in FIGS. 2 and 3 are of the semi-hollow type, and are described in French patent application FR 2 913 915. In the example of FIGS. 2 and 3, the tyres 17 have a semi-hollow dome profile. The semi-hollow profile comprises two sides joined to a sheath. The sheath is positioned substantially parallel to the wall of the tube 15. The sides of the semi-hollow profile extend in a direction opposite to the tube 15. The sides are joined together at their edges opposite to the tube 15. The joined edges of the sides form the dome. The outer casing of the dome forms part of the tire 13. The outer casings of the sides and dome form, in a plane comprising the first axis XX, circumferential ribs of the roller 11 interleaved between the half-sculptures formed by the tyres 19. The term "rib" here denotes the male portion of the tyre profile 17, while the term "sculpture" here denotes the female part of the tyre profile 19.

In the example described here, the sheath and the sides delimit a hollow annular space. Because of this configuration, the tyres 17 are semi-hollow; that is to say, the hollow annular space is not inflated but can communicate with the ambient environment through a hole (not shown) passing through the thickness of the sheath. This hole allows the pressures to be balanced during use, and also allows pressurized air to be introduced in the vulcanization process during production.

This is because it is desirable for the tyres 17 to be deformable to some extent in the region between the dome and the sheath, to facilitate the disengagement of the earth which would otherwise tend to adhere to the side regions of the tyres. This deformation of the tyre, which gives it sufficient flexibility to absorb the effects of unevenness and to be self-cleaning, is limited by the domed shape, which prevents excessive sagging of the dome.

In a variant, the tyres 17 are solid; that is to say, there is no annular hollow space. Other types of tire or tyres may also be used.

In the example described here, the sheath is reinforced mechanically by metal bands embedded in the material of the tyre 17, 19, particularly for the purpose of providing better retention on the tube 15, despite the mechanical stresses on the tyres 17, 19 which may be rather intense and abrupt. In a variant, the tyre comprises no metal bands.

The roller 11 further comprises a ring 23 fastened to the inner surface of the tube 15 in the proximity of each of the axial ends of the tube 15. The ring 23 forms an inner shoulder of the tube 15.

The roller 11 further comprises an end shield 25 at each of its ends, partially closing each of the ends of the tube 15. The end shield 25 is generally dome-shaped. The end shield 25 comprises, on its circumference (on the right in FIG. 3), an annular rim 27 extending radially outwards and arranged to bear against the free edge of the tube 15. The end shield 25 comprises a substantially cylindrical portion, fixed to the rim 27, designed for insertion against the inner end surface of the tube 15. The cylindrical portion is axially delimited by a shoulder 29 forming a recess orientated radially towards the inside of the tube 15 and arranged to bear against the ring 23 of the tube 15. The end shield 25 comprises a rounded base having an outside diameter smaller than the inside diameter of the ring 23 and extending axially beyond the ring 23 towards the middle of the tube 15. In the example described here, the base of the end shield 25 is pierced with a substantially circular opening centred on the axis XX.

Thus, during assembly, the end shield 25 can be inserted in the direction XX of the tube 15 from the outside towards the inside of the tube 15, so as to be housed inside the tube 15 with the exception of the annular rim 27, which bears against the outer circumference of the tube 15. The end shield 25 is fixed to the tube 15, in this case by means of screws 31 passing through the shoulder 29 and the ring 23 at points distributed around the circumference. An assembly of this type can be dismantled. In a variant, the end shield 25 could be fastened to the tube 15 by welding, shrinking, or the like. In the assembled state, the rim 27 of the end shield 25 bears partially against the flange 21.

When fastened in the tube 15, the end shield 25 defines an open space facing towards the outside of the tube 15. The open space forms a housing for the bearing and the suspension members described below.

As shown in FIG. 3, a ring 33 is positioned diametrically around the rim 27 so as to form a substantially continuous radial surface between the outside of the tyre 17' and the rim 27. An arrangement of this type enables the accumulation of debris to be limited during use.

In a variant, the ring 23 may be replaced by spaced blocks, for example threaded parallelepipedal steel blocks welded inside the tube 15.

It is also feasible to omit the shoulder contact between the tube 15 and the rim 27 of the end shield and to replace the ring 23 with three rigid blocks spaced apart angularly at 120° with supplementary fastening members interleaved between these blocks, these members being rigidly positioned in the plane yz but deformable in the direction x. This provides a close contact between the end shield, which is very rigid, and the blocks and supplementary fastening members. This enables the interface between the end shield and the tube to transmit forces, particularly the braking forces if the suspended roller is braked.

Other types of fastening between the end shield and the tube are feasible.

The roller 11 further comprises a half-shaft 35. In the example described here, the half-shaft 35 is fastened to the end shield 25 in such a way that its axis of symmetry substantially coincides with the axis XX of rotation of the rest of the roller 11. The half-shaft 35 is designed so as to be housed inside the end shield 25 and the tube 15. In other words, the axial end of the outer side (on the right in FIG. 3) of the half-shaft 35 is set back with respect to the end of the tube 15.

The ground shaping tools 1 further comprise a bearing 37 housed in the open space of the end shield 25 and around the half-shaft 35. The bearing 37 is a solid component having a complex shape suitable for accommodating the rotation of the half-shaft 35. The bearing 37 here has a through opening 39. The opening 39 receives a cylindrical portion of the half-shaft 35. Annular grooves are formed in the opening 39 and house ball bearings 41 which facilitate the rotation of the half-shaft 35 in the opening 39 of the bearing 37. The alignment of the two half-shafts 35 and the openings 39 of the two bearings 37 supporting the same roller 11 defines the axis XX of rotation of the roller 11 with respect to the bearings 39.

The bearing 37 can also form a casing which houses at least one braking means for exerting a resistant torque in a controlled manner between the bearing and the roller 11, as described below.

The bearing 37 is connected to the support 7 via suspension means. The bearing 37 therefore has at least one degree of freedom with respect to the support 7. The suspension means will now be described with reference to FIGS. 3, 4, 5 and 6 simultaneously, which will provide a better understanding of the three-dimensional organization of an embodiment of the invention.

Figure 4:
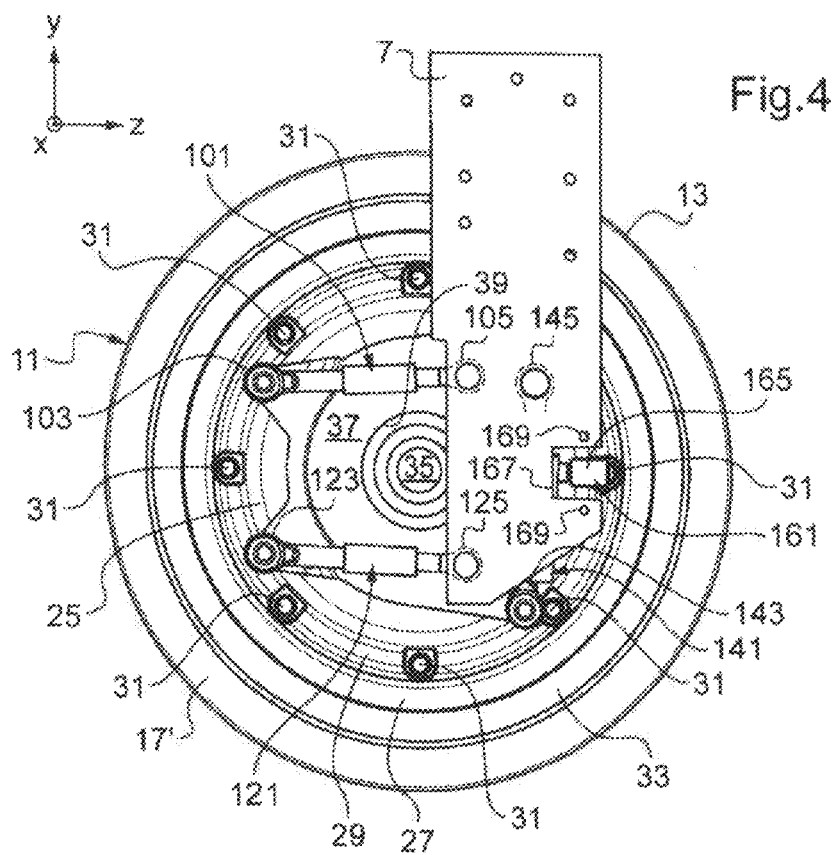
FIG. 4 is a view from the left-hand side of the machine of FIG. 1 through the plane IV-IV, where the left-hand tool is not shown.

FIG. 4 shows a view from the left-hand side of the machine, relating to the right-hand tool 1B, the left-hand tool 1A not being shown.

Figure 5:
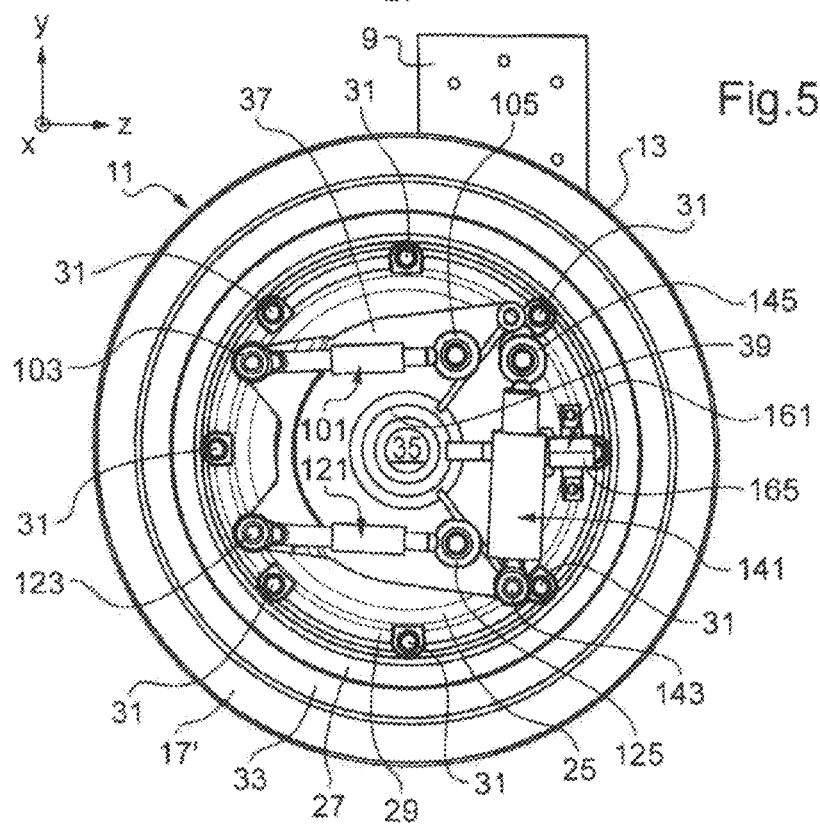
FIG. 5 is a view similar to that of FIG. 4, in which a support is not shown.

FIG. 5 is identical to FIG. 4 with the exception of the support 7, which is not shown.

Figure 6:
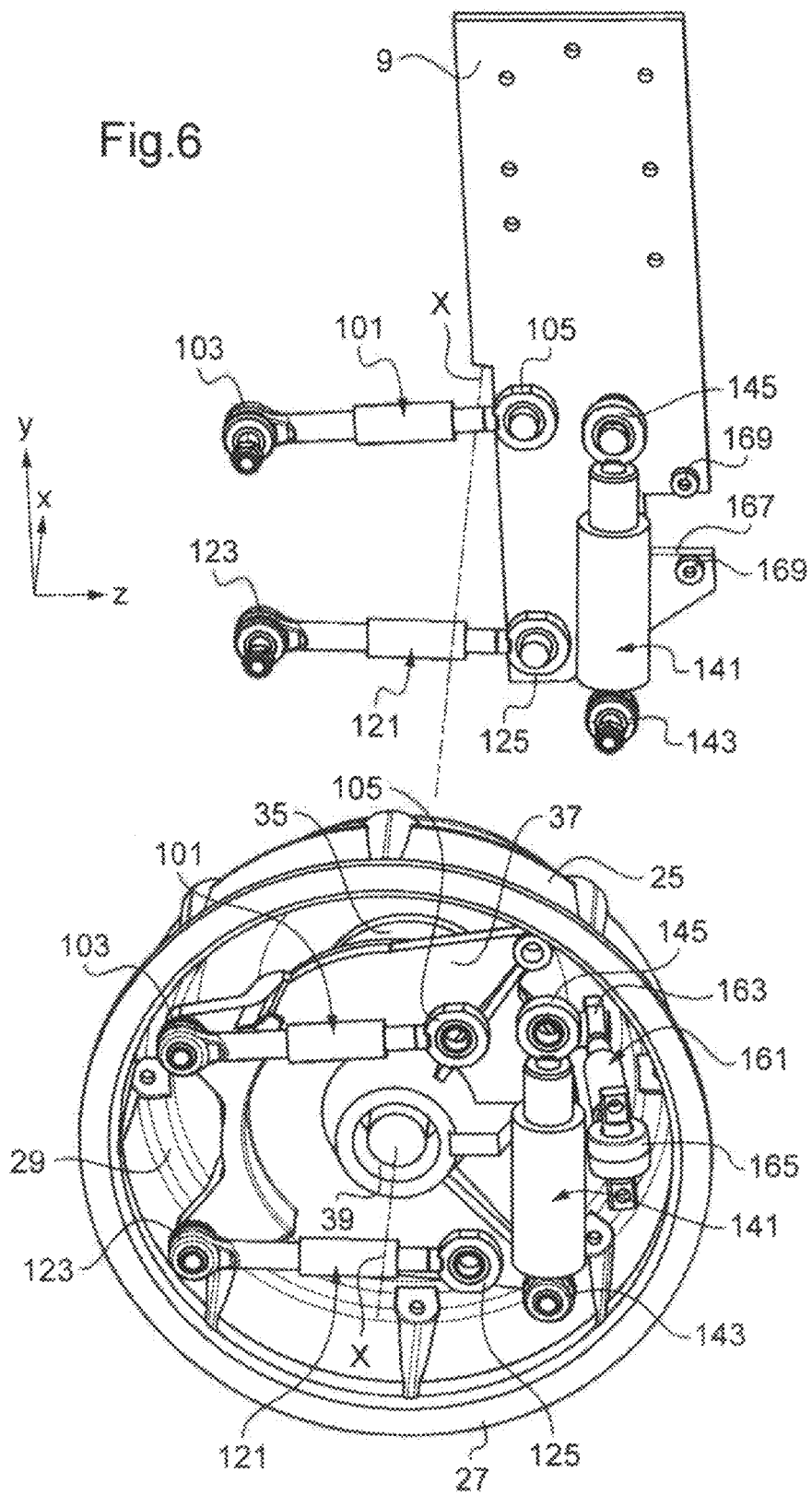
FIG. 6 is a perspective view of the right-hand tool of the machine of FIG. 1, in which certain members only are shown.
Figure 7:
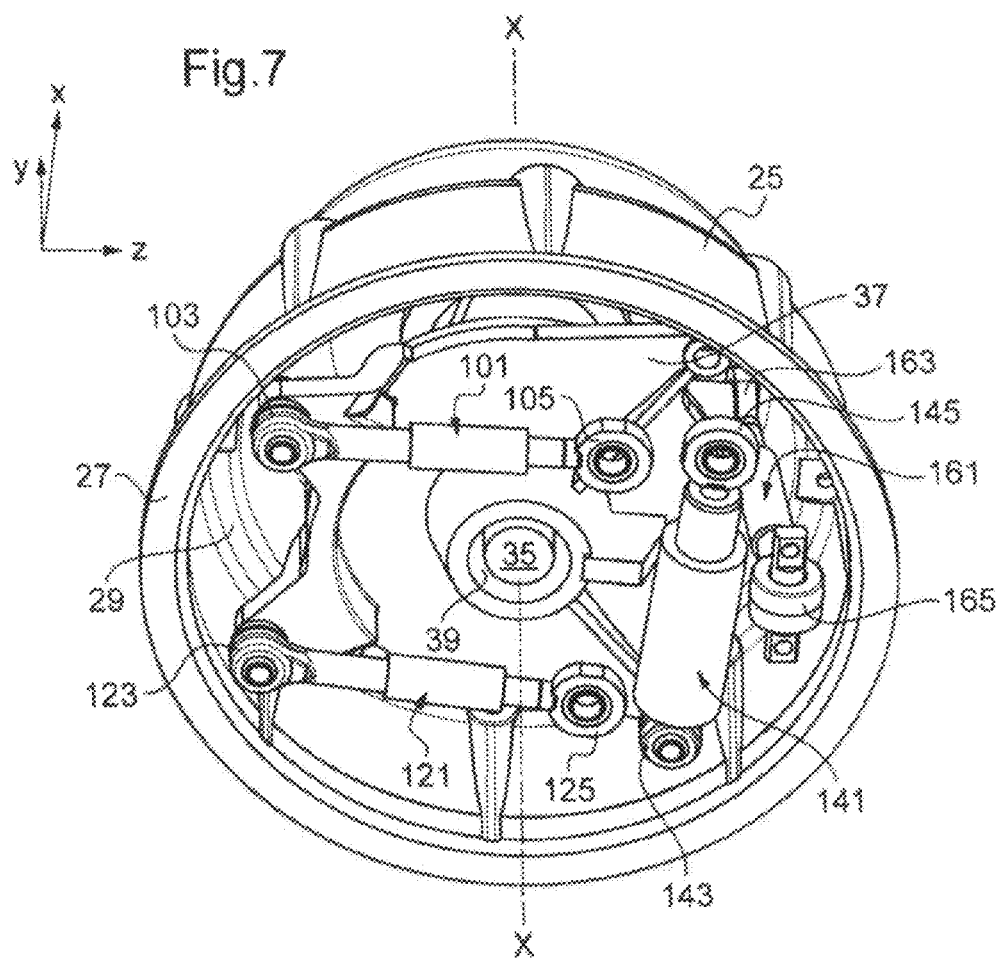
FIG. 7 is a perspective view of part of a ground shaping tool.
Figure 8:
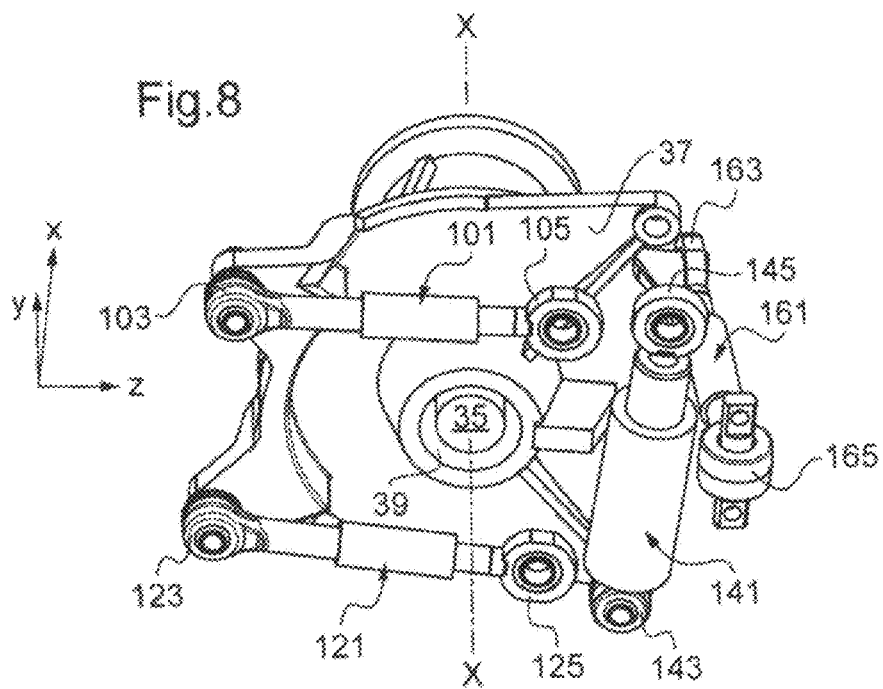
FIG. 8 is a perspective view of a bearing and of suspension means.
Figure 9:
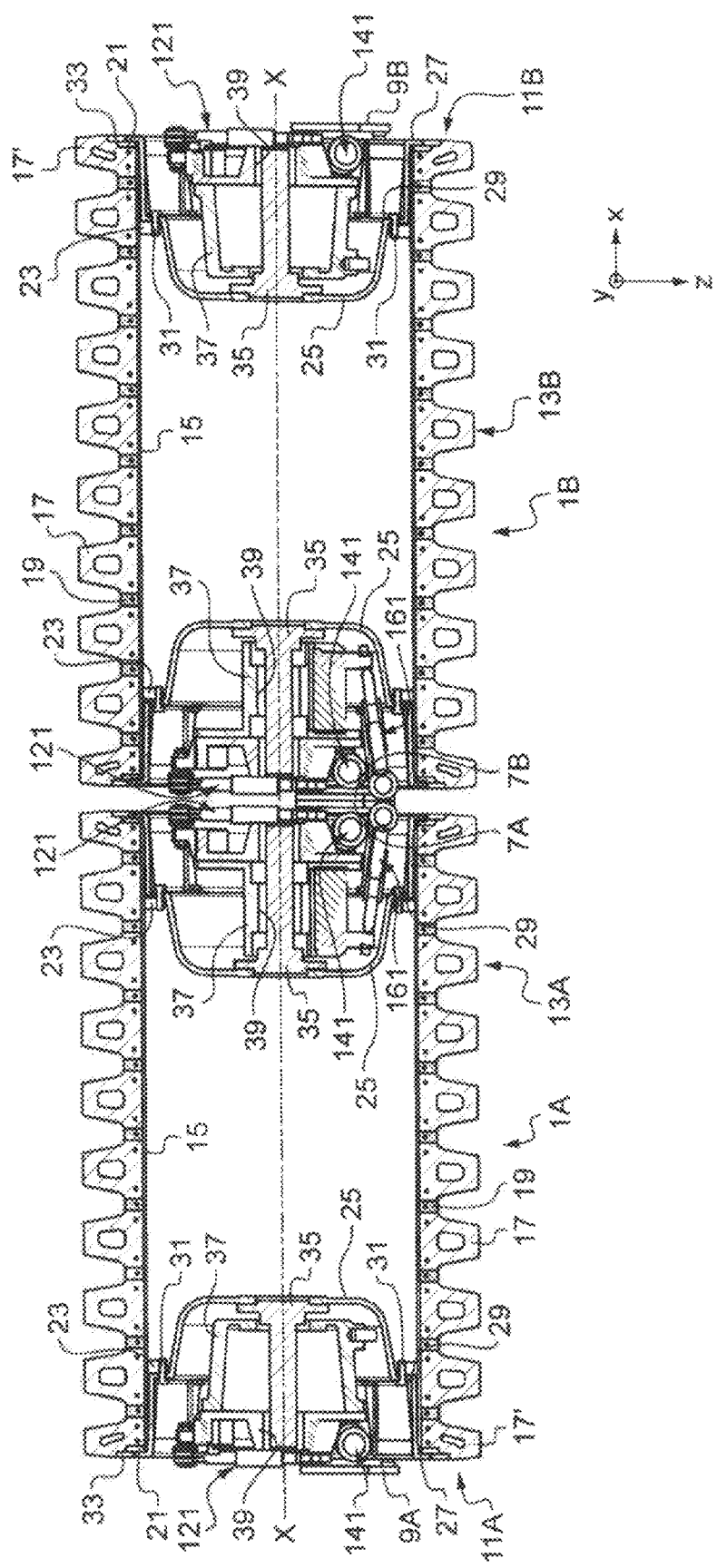
FIG. 9 is a view in longitudinal section taken along the plane IX-IX of the machine of FIG. 1.

FIG. 6 is a perspective view of the right-hand tool 1B in which the right-hand bearing 37 and the roller 11 are not shown, except for the left-hand end shield 25.

The suspension means shown here form a mechanism comprising an upper arm 101 or upper link, a lower arm 121 or lower link, a resilient return member 141 and a supplementary arm 161.

In the example described here, the upper arm 101 and the lower arm 121 are substantially similar. The upper arm 101 and the lower arm 121 comprise first ends 103 and 123 respectively, and second ends 105 and 125 respectively.

In the example described here, the suspension means further comprise a resilient return member 141. In this case, the resilient return member 141 is a pneumatic or hydraulic actuator. The actuator 141 comprises a first end 143, fixed to the cylinder in this case. The actuator 141 also comprises a second end 145, fixed to the piston in this case. In a variant, the actuator piston may be orientated in a downward direction and the actuator cylinder may be orientated in an upward direction.

At least one of the ends of a roller 11, in this case only the end located nearer the inner support 7, is provided with a supplementary arm 161 belonging to the suspension means. The supplementary arm 161 comprises a first end 163 and a second end 165.

In the example described here, the bearing 37 comprises four studs projecting towards the outside (on the left-hand side) of the bearing 37 and orientated in a direction substantially parallel to the axis XX. Each of the first ends 103, 123, 143 and 163 comprises a through opening arranged to house one of the studs of the bearing 37.

The first ends 103, 123, 143 and 163 are fastened to the bearing 37 so as to be freely rotatable about an axis substantially parallel to the axis XX, by means of the studs of the bearing 37.

Similarly, the support 7 comprises four studs projecting towards the inside of the roller 11 (on the right-hand side) and orientated in a direction substantially parallel to the axis XX. Each of the second ends 105, 125, 145 and 165 comprises a through opening arranged to house one of the studs of the support 7.

The second ends 105, 125, 145 and 165 are fastened to the support 7 so as to be freely rotatable about an axis substantially parallel to the axis XX, by means of the studs of the support 7.

The mutual arrangement of the upper arm 101 and the lower arm 121, and their fastenings to the support 7 and to the bearing 37, are chosen in such a way that the upper arm 101 and the lower arm 121 are positioned substantially in a plane perpendicular to the axis XX, that is to say substantially parallel to the main plane of the support 7.

In a rest position, that is to say when the roller 11 is placed on the ground and stationary, each of the upper arms 101 and lower arms 121 forms an angle of less than 20° with respect to the horizontal direction z. This angle may be zero, positive or negative. The upper arm 101 and the lower arm 121 are substantially coplanar. The principal directions of the upper arm 101 and the lower arm 121 form an angle of less than 40°.

In the example described here, the combination of the upper arm 101 and lower arm 121, at rest, allows the bearing 37 to move with respect to the support 7 in a plane substantially perpendicular to the axis XX. The upper arm 101, the lower arm 121, the segment connecting the first end 103 of the upper arm 101 to the first end 123 of the lower arm 121, and the segment connecting the second end 105 of the upper arm 101 to the second end 125 of the lower arm 121 form a deformable quadrilateral. This quadrilateral may be, for example, a parallelogram, a trapezium, or even a diamond shape. The distance between the first ends 103, 123, on the one hand, and the distance between the second ends 105, 125, on the other hand, are constant, and the lengths of the upper arm 101 and lower arm 121 are constant; therefore, the movement of the sub-assembly comprising the support 7, the upper arm 101, the lower arm 121 and the bearing 37 is such that these members are movable relative to each other in a movement resembling that of a pantograph.

In the example described here, the first ends 103, 123 are included within a common vertical direction. Similarly, the second ends 105, 125 are included within a common vertical direction. This combination permits a large vertical movement of the bearing 37 (in the direction y) with respect to the support 7, compared with the size of the permitted horizontal movement (in the direction z). In other words, in operation, the ground shaping machine is pulled from the right to the left in FIGS. 4 to 6. This movement is transmitted to the upper arm 101 and lower arm 121, and more particularly via the studs of the support 7 and the second ends 105 and 125. In reaction, the upper arm 101 and the lower arm 121 transmit the horizontal movement by traction on the bearing 37, more precisely via the first ends 103 and 123. The vertical movements (direction y) of the roller 11 in contact with the ground cause the rotation of the joints 103, 105, 123, 125. The transmission of the vertical displacement of the roller towards the frame 3 is therefore limited. The roller 11 is suspended.

In a variant, the joints 103, 105, 123, 125 may be ball joints. In addition to the displacements in the plane perpendicular to the axis XX, the bearing 37 and the support 7 may have a relative displacement in a direction substantially parallel to the axis XX (the direction x). This makes it possible to limit the transmission of the movements of the roller 11 to the frame 3 in the direction x and to limit the stresses to which the mechanism is subjected.

The actuator 141 is arranged in a substantially vertical direction (direction y). The studs of the support 7 on the one hand, and of the bearing 37 on the other hand, are substantially aligned in a vertical direction (the direction y) when at rest. The stroke of the piston of the actuator 141 is chosen so as to limit the relative vertical displacement between the support 7 and the bearing 37. The actuator 141 also returns the bearing 37 to a vertical rest position. Both in operation and at rest, the rotary mounting of the two ends 143, 145 of the actuator 141 allows the actuator 141 to be inclined with respect to the vertical, particularly during the activation of the upper arm 101 and lower arm 121 and the horizontal displacement in the direction x of the bearing 37 with respect to the support 7.

In the example described here, the actuator 141 is also a damping means. In other words, in operation, the actuator 141 can be used to brake the vertical movement between the support 7 and the bearing 37, and vice versa. The resilient return means and the damping member are combined with each other.

In a variant, the resilient return means and the damping member are two separate components. For example, the damping member may comprise a damping arm and the resilient return means may comprise a helical spring, and the two components may or may not be concentric.

The suspension means may be present on only one side of the roller or on both sides. The deformable quadrilateral mechanism and the resilient return member may be present on each side of a shaping tool, and a supplementary arm 161 may be provided on only one of the two sides.

In another variant, the actuator may be controlled so as to adapt the reactive forces. In other words, the damping is adaptable. For example, the stroke of the actuator may be blocked or made negligible in a working position in the field, whereas it is maximal in a road transport position. This enables suspended and if necessary damped behaviour to be obtained on roads, whereas in the soil working position the weight of the machine is used to compact or re-compact the soil and provides greater uniformity of the force applied to the soil during the advance of the machine.

Figure 10A:
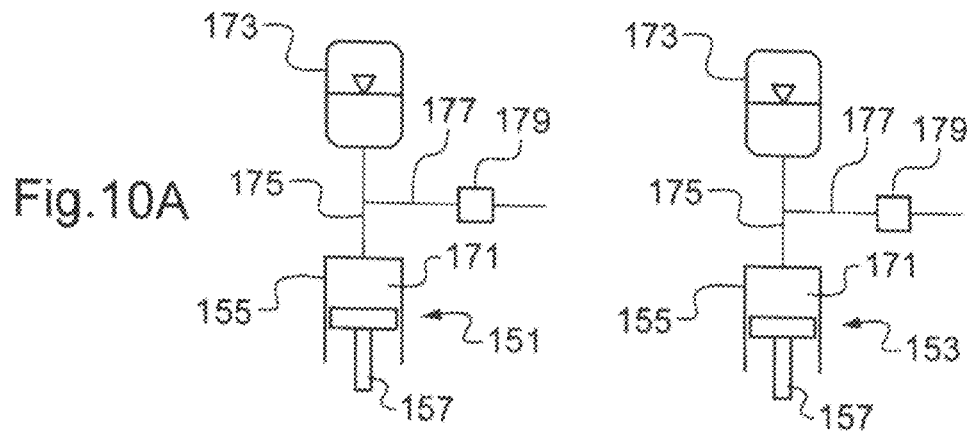
FIGS. 10A, 10B and 10C are schematic illustrations of various embodiments of hydraulic circuits used in the invention.
Figure 10B:
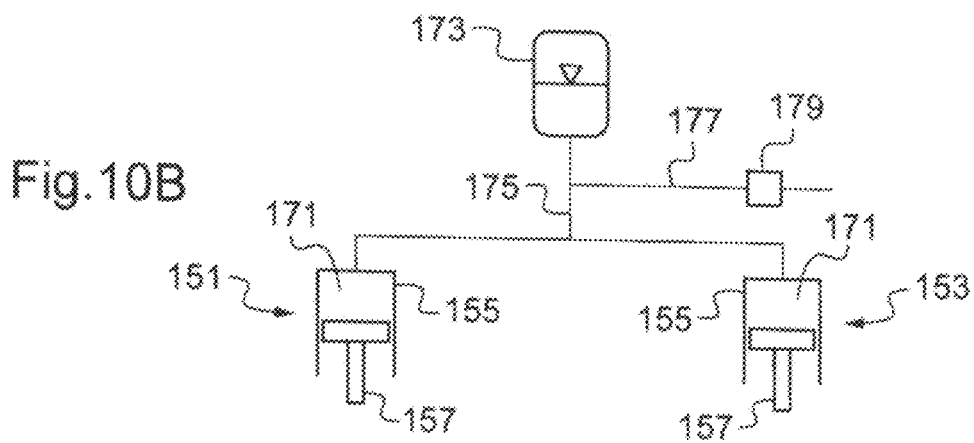
Figure 10C:
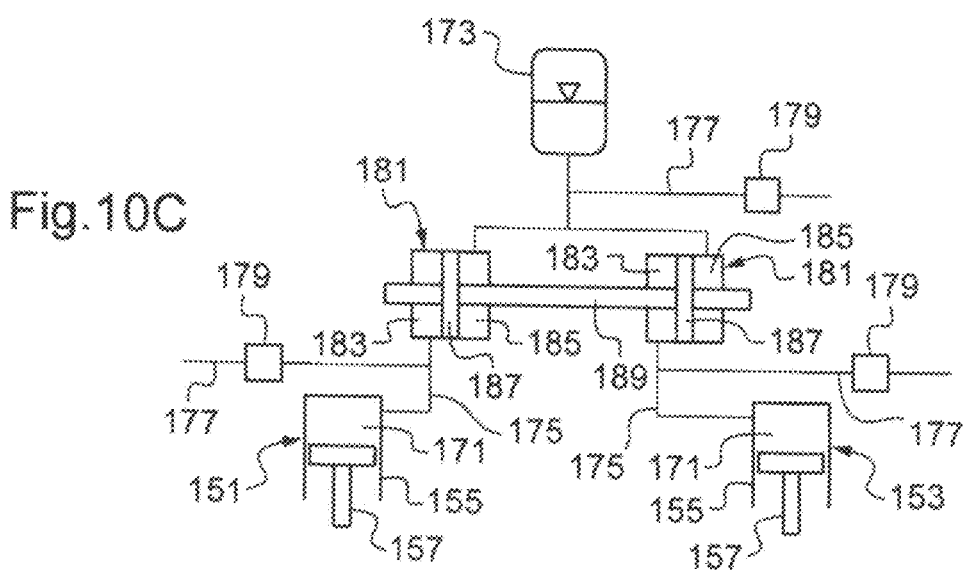

FIGS. 10A, 10B and 10C show three embodiments of damping members of the controlled hydraulic actuator type. Two single-acting actuators 151, 153 are controlled in an independent or decoupled manner. Each actuator comprises a cylinder 155 housing a piston head 157. Each actuator 151, 153 forms a chamber 171 and 173 respectively, the volume of which depends on the position of the piston head 157 in the cylinder 155. In this case, the cylinder 155 is fastened to the frame 3 which is not shown, and the end of the piston 157 opposite the head is fastened to the bearing 37 which is not shown. More precisely, the cylinder 155 of the actuator 151 is fastened to the support 7 arranged on one side of the tool, while the cylinder 155 of the actuator 153 is fastened to the support 9 on the opposite side of the tool.

In the embodiment of FIG. 10A, each of the chambers 171 of the actuators 151, 153 is fluidly connected to a hydropneumatic accumulator 173 through a conduit 175. Each chamber 171 and each conduit 175 is filled with incompressible fluid, which is oil in this case. Each hydropneumatic accumulator 173 is filled with oil in its lower part and with a compressible gas, such as nitrogen, in its upper part. This forms a hydropneumatic accumulator. Each conduit 175 is supplied with oil through a supply conduit 177 on which a controllable valve 179 is mounted. In a static condition, an oil supply control can be used to determine the volume of the chamber 171 and consequently the rest position of each actuator 151, 153 independently of each other. In a dynamic condition, that is to say when the machine is moving, the movement of the piston 157 is damped, in a known way, by the compression/expansion of the volume of compressible gas in the hydropneumatic accumulator 173. The two actuators 151, 153 are independent of each other. Consequently the behaviour of one side of the tool during movement can be substantially decoupled from the behaviour of the other side.

In the embodiment of FIG. 10B, the assembly resembles that of FIG. 10A and the common members are referenced in an identical manner. In this case, each of the actuators 151, 153 is fluidly connected to a common hydropneumatic accumulator 173 through a conduit 175 which splits into two branches, each supplying one of the chambers 171. In this embodiment, the two chambers 171 are therefore in fluid communication. In other words, the sum of the volumes of the two chambers 171 is constant in static operation. The expression "static operation" is used here to denote a situation in which there is no vertical acceleration or change in the mass of the machine. The forces in the two actuators are proportional according to the ratio of the hydraulic cross sections of the actuators. The movement of the two pistons 157 is therefore in opposite directions: when one rises, the other descends, and vice versa. This gives rise to a behaviour of the tool resembling that of a beam suspended at the pivot point, the latter being located at the point which divides the total length into two parts inversely proportional to the surface areas of the actuators.

In the embodiment of FIG. 10C, the assembly resembles that of FIG. 10B and the common members are referenced in an identical manner. In this case, an auxiliary housing 181 is interposed in each of the branches supplying the two chambers 171 of each of the actuators 151, 153. Each auxiliary housing 181 is divided into two chambers 183, 185 by a fluid-tight movable wall 187, forming a double-acting actuator. The movable walls 187 are coupled to each other in such a way that the movement of one causes the movement of the other in the same direction. This coupling is provided here by means of a rod 189 fastened to each of the movable walls 187. The expression "same direction" here signifies that the movement of one of the walls 187 in a direction which displaces the oil from the chamber 171 towards the hydropneumatic accumulator 173 for the actuator 151 causes a displacement of the oil in the same direction for the actuator 175. The volumes of the two chambers 171 are therefore proportional in static operation. The expression "static operation" here refers to a situation in which, still in the absence of vertical acceleration, the mass of the machine is likely to vary. In other words, the double-acting pistons formed by the auxiliary housings 181 and the movable walls 187 are controlled by each other in such a way that their strokes are proportional. The movement of the two pistons 157 is coupled: when one rises, the other also rises, and vice versa. This causes the behaviour of the tool to be substantially identical on each side. The two actuators are forced to undergo displacements in the same direction, which are inversely proportional to the respective cross sections.

In the examples of FIGS. 10B and 10C, the two actuators 151, 153 are identical, notably as regards their dimensions, thus providing an approximately identical stroke of each piston 157. In a variant, the chambers 171 may be made with different volumes, in order to provide a movement reduction effect between one and the other of the actuators 151, 153.

In a variant, the joints 143, 145 are ball joints. This variant is particularly suitable for use in the variant described immediately above, where the joints 103, 105, 123, 125 of the upper arm 101 and lower arm 121 are ball joints. In addition to the displacements in the plane perpendicular to the axis XX, the bearing 37 and the support 7 may have a relative displacement in a direction substantially parallel to the axis XX (the direction x). This makes it possible to limit the transmission of the movements of the roller 11 to the frame 3 in the direction x. The ball joints limit the stresses acting on the joints between the upper arm 101, the lower arm 121, the resilient return means 141 and the support 7, and the bearing 37.

The supplementary arm 161 is positioned substantially parallel to the axis XX in the rest position. The pivots of the first end 163 and the second end 165 are preferably ball joints with the bearing 37 on the one hand and with the support 7 on the other hand. In operation, the supplementary arm 161 transmits the relative movements between the roller 11 and the frame 3 in a horizontal direction which is substantially parallel to the axis XX. The supplementary arm 161, like the upper arm 101 and the lower arm 121, therefore operates essentially either in traction or in compression, depending on its longitudinal direction. Thus the mechanical stresses resulting from the movements in the lateral direction x between the roller 11 and the frame 3 are preferably exerted on the supplementary arm 161, rather than on the pivots 103, 105, 123, 125 of the upper arm 101 and the lower arm 121. This limits the operation of the upper arm 101 and the lower arm 121 in flexion at their respective ends. Additionally, a separation is maintained between the support 7 and the roller 11, preventing the side of the roller 11 from rubbing against the support 7 and thus facilitating rolling. The supplementary arm 161 facilitates the maintenance of this separation.

For a shaping tool 1A, 1B, a supplementary arm 161 may be provided on the left-hand side only, on the right-hand side only, on each of the two sides, or on neither of them. If there is no supplementary arm 161, the variant in which the ends of the upper arm 101 and lower arm 121 and/or of the resilient return means 141 form ball joints with the support 7 and/or the bearing 37 is most suitable for avoiding concentrations of stresses at the joints. In other words, the ball joints provide a further degree of freedom for the roller 11 with respect to the frame 3 in the direction x.

In the rest position, as shown in FIG. 4, the two supports 7 and 9 are offset from the axis XX of rotation of the roller 11.

The first joints 103, 123 of the upper arm 101 and lower arm 121 are positioned in a front part of the bearing 37, shown on the left in FIG. 4. By means of this arrangement, the first ends 103 and 123 respectively can be spaced apart from the second ends 105 and 125 respectively in the direction z. In other words, the length of the upper arm 101 and of the lower arm 121 respectively is substantial. As the length of the upper arm 101 and the lower arm 121, respectively, increases, the permitted extent of relative displacement between the roller 11 and the frame 3 increases likewise. However, the length of the upper arm 101 and lower arm 121 is limited by the overall dimensions of the device. In other words, in this case the suspension means are mainly housed inside the casing of the roller 11. This enables the supports 7, 9 to be arranged as close as possible to the rollers 11 without being in contact. Thus a plurality of tools 1 can be juxtaposed, as shown in FIGS. 1 and 2.

The separation between the two treads 13A and 13B is thus greater than the thickness of the two supports 7A and 7B. This limits the area in which the flexible tire is absent at the interface of the two juxtaposed rollers 11A, 11B. In particular, an interval of repetition in the direction y of an elementary pattern of the flexible tire 13, for example the dome profiles in this case, can be maintained at the interface of two rollers 11.

In a variant, more than two tools are juxtaposed in this manner. For example, ground shaping machines may comprise two central rollers similar to those of FIGS. 1 and 2, while the supplementary lateral rollers are juxtaposed and aligned when in the working position, and are in the retracted or raised position when in the transportation position. This enables the width of the machine to be adapted according to its use.

In the embodiments described up to this point, the ground shaping machine is designed to be pulled in a direction of movement (from the right towards the left in FIGS. 2 and 4 to 8) in which the supports 7 and 9 are offset rearwards with respect to the axis XX of rotation system of the rollers 11. However, the movement of the machine in the opposite direction, that is to say from left to right, is equally possible.

FIG. 11 shows an embodiment comprising a stop system limiting the relative vertical displacement between the bearing 37 and the support 7. The support 7 comprises a housing 71 and the bearing 39 comprises a pin 73. In a variant, the support 7 comprises a pin and the bearing 39 comprises a housing. The pin 73 and the housing 71 are arranged with respect to each other so as to interact in order to provide a stop. The housing 71 here comprises a substantially vertical slot (running in the direction y). The pin 73 and the housing 71 limit the extent of the displacement of the bearing 37 with respect to the frame 3. They form a stop system or a system for limiting the extent of the vertical movement between the bearing 37 and the support 7 permitted by the assembly comprising the upper arm 101 and the lower arm 121. The pin 73 and the housing 71 may be arranged with respect to each other in a direction substantially parallel to the direction of advance (direction z) in order to form a stop system or a system for limiting the extent of the horizontal movement between the bearing 37 and the support 7 permitted by the assembly comprising the upper arm 101 and the lower arm 121. The pin 73 and the housing 71 may be arranged with respect to each other to form a combined stop system or a system for limiting the extent of both the horizontal movement (in direction z) and the vertical movement (in direction y) between the bearing 37 and the support 7 permitted by the assembly comprising the upper arm 101 and the lower arm 121.

The machine has a transportation position and a working position. It comprises a means for neutralizing the suspension means such that the movements of the bearings 37 with respect to the frame 3 can be blocked. The neutralization means can be activated, notably, in the working position. In a combination of variants comprising controlled actuators and the stop system, the controlled actuators can force the pin 73 to remain bearing on the stop in a limit position in the housing 71. Thus the machine comprises a means for neutralizing the suspension means such that the movements of the bearings 37 with respect to the frame 3 can be blocked. The neutralization means can be activated, notably, in the working position.

FIG. 12 shows how the bearing 37 forms a casing which houses at least one braking means 190 (shown schematically) positioned in the annular space delimited between the bearing 37 and the half-shaft 35. This braking means 190 can be, notably, a drum brake or a disc brake. It enables a resistant torque to be applied in a controlled manner between the bearing 37 and the roller 11.

The invention is not limited to the embodiments described in detail or to the variants which have been described. Notably, although the embodiments described relate more specifically to agricultural machines, the invention is adaptable to any type of ground shaping machine provided with rollers. For example, the machine may be a civil engineering vehicle and/or a road-mending machine. Machines of this type are provided with a roller or rollers for flattening or levelling the ground. The invention enables these machines to behave more flexibly while travelling. The irregularities of the ground are partially absorbed, thus limiting the stresses and impacts to which the machines are subjected.

This type of system enables the behaviour of the machine to be improved both on roads and in fields or while working, by adapting to the irregularities of the ground being worked.

The invention claimed is:

1. A ground shaping machine, comprising
a frame,
at least one roller fitted with a flexible tire,
a first bearing and a second bearing whereby the roller can rotate about a substantially horizontal axis in the working position, the first and the second bearing being positioned one at each end of the roller,
wherein the frame includes a first support and a second support, the first support at least being connected to the first bearing through a suspension means device including
a mechanism with an upper arm and a lower arm, both substantially horizontal and perpendicular to the axis of rotation of the roller, each of the upper and lower arms being connected by a joint to the first support, and to the first bearing, the mechanism forming a deformable quadrilateral, and
a substantially vertical resilient return member connected by a joint to the first support, and to the first bearing.

2. A machine according to claim 1, wherein the suspension device further comprises a supplementary arm connected by a joint to the first support or to the second support, and to the first bearing or to the second bearing respectively, in a direction substantially parallel to the axis of rotation of the roller.

3. A machine according to claim 1, further comprising a substantially vertical damping member connected to the first support, and to the first bearing.

4. A machine according to claim 3, wherein the resilient return means and the damping member are combined with each other.

5. A machine according to claim 1, wherein the joints of the upper arm and lower arm are ball joints.

6. A machine according to claim 1, wherein the roller comprises a tube supporting the flexible tire, the suspension device being housed, in a rest position, substantially within the tube.

7. A machine according to claim 1, wherein the roller comprises a tube supporting the flexible tire, the tube being at least partially closed at one or both of its ends by a dome-shaped end shield, the open space facing towards the outside of the tube forming a housing for the first bearing and the suspension device.

8. A machine according to claim 1, wherein the first support and the second support are substantially flat plates.

9. A machine according to claim 1, wherein the first support comprises a pin and the first bearing comprises a housing, or vice versa, the pin and the housing being arranged with respect to each other so as to interact by forming a stop and limit the extent of the displacement of the first bearing with respect to the frame.

10. A machine according to claim 1, wherein the second support is connected to the second bearing through supplementary suspension device.

11. A machine according to claim 10, wherein the supplementary suspension device conforms to the suspension.

12. A machine comprising two assemblies, each of the assemblies being formed by a machine according to claim 1, the frames being common and mirror images of each other about a substantially vertical plane.

13. A machine according to claim 1, wherein at least one of the bearings forms a casing which houses at least one braking means for exerting a resistant torque in a controlled manner between the bearing and the roller.

14. A machine according to claim 1, having a transportation position and a working position and comprising a means for neutralizing the suspension device such that movements of the bearings with respect to the frame can be blocked, the means for neutralizing being activatable in the working position.

15. A machine according to claim 11, comprising at least two damping members connected, respectively, to the first support and to the first bearing, and to the second support and to the second bearing, each of the damping members comprising a hydraulic actuator connected to a respective hydropneumatic accumulator which is independent of the other accumulator.

16. A machine according to claim 11, comprising at least two damping members connected, respectively, to the first support and to the first bearing, and to the second support and to the second bearing, each of the damping members comprising a hydraulic actuator whose respective chamber is connected to a common hydropneumatic accumulator.

17. A machine according to claim 16, wherein each of the damping members is connected to the common accumulator through a double-acting piston, the double-acting pistons being controlled by each other in such a way that their strokes are proportional.

* * * * *